United States Patent Office 3,445,188
Patented May 20, 1969

3,445,188
PREPARATION OF HYDROGEN BROMIDE
Daniel N. Heintz, Brentwood, and Robert G. Lange, St. Louis, Mo., assignors to Monsanto Company, St. Louis, Mo., a corporation of Delaware
No Drawing. Filed Apr. 18, 1967, Ser. No. 631,599
Int. Cl. C01b 7/12
U.S. Cl. 23—154    8 Claims

ABSTRACT OF THE DISCLOSURE

This invention relates to the production of gaseous hydrogen bromide by a process wherein sulfuric acid is reacted with a bromide salt in the presence of an inert organic solvent.

---

This invention relates to a process for the preparation of substantially anhydrous, gaseous hydrogen bromide.

Various methods for the manufacture of hydrogen bromide in gaseous form have been proposed in the prior art. Such methods include the direct combination of hydrogen and bromine vapor wherein platinized asbestos or platinized silica gel may be used as a catalyst; the reaction of bromine with sulfur or phosphorus and water; and the bromination of certain organic compounds. These methods are subject to several undesirable features, among which are the high cost of raw materials, incomplete utilization of bromine and the risk of explosion.

Another known method for preparing gaseous hydrogen bromide comprises reacting concentrated sulfuric acid and an alkali metal bromide in a mixture containing water and hydrogen bromide. A particular disadvantage of this method resides in the need for maintaining the water concentration in the mixture within certain definite and critical limits in order to produce anhydrous hydrogen bromide gas.

Accordingly, it is a primary object of this invention to provide a novel and improved process for the preparation of gaseous hydrogen bromide in which the attendant disadvantages of the prior art are eliminated.

It is a further object of this invention to provide a process for producing gaseous hydrogen bromide which process is suitable for operation on a commercial scale.

Other and different objects, advantages and features of this invention will become apparent to those skilled in the art upon consideration of the following detailed description and claims.

According to the present invention, substantially anhydrous gaseous hydrogen bromide is prepared by reacting an alkali metal bromide, an alkaline earth metal bromide or a tertiary amine salt of hydrogen bromide with concentrated sulfuric acid under anhydrous conditions while the reactants are contained in a liquid, inert and anhydrous reaction medium.

The amount of concentrated sulfuric acid employed should be equal to at least one mole for each equivalent of bromide salt reactant. The inert organic solvent is found to be suitable over a wide range of quantities. The lower limit of solvent employed is that amount sufficient to provide a fluid system and the upper limit of solvent will be primarily dependent upon practical and economic considerations. The reaction is carried out at a temperature ranging from about 25° C. to about 150° C. A preferred temperature range varies from about 90° C. to about 130° C.

The alkali metal bromides which can be used in the process of this invention are sodium bromide, potassium bromide, lithium bromide and the like.

Representative of the alkaline earth metal bromides which may be employed herein are calcium bromide, magnesium bromide, barium bromide and the like.

Among the tertiary amine salts of hydrogen bromide which can be used in the present process are the heterocyclic tertiary amine salts of hydrogen bromide such as pyridine hydrobromide,
α-picoline hydrobromide,
γ-picoline hydrobromide,
β-picoline hydrobromide,
quinoline hydrobromide,
isoquinoline hydrobromide,
2-methyl quinoline hydrobromide,
3-methyl quinoline hydrobromide,
4-methyl quinoline hydrobromide,
5-methyl quinoline hydrobromide,
6-methyl quinoline hydrobromide,
7-methyl quinoline hydrobromide,
8-methyl quinoline hydrobromide,
2-ethyl quinoline hydrobromide,
4-ethyl quinoline hydrobromide,
2,3-dimethyl quinoline hydrobromide,
2,4-dimethyl quinoline hydrobromide,
2,8-dimethyl quinoline hydrobromide,
3,4-dimethyl quinoline hydrobromide,
4,6-dimethyl quinoline hydrobromide,
4,7-dimethyl quinoline hydrobromide,
4,8-dimethyl quinoline hydrobromide,
5,8-dimethyl quinoline hydrobromide,
6,8-dimethyl quinoline hydrobromide,
2,3,8-trimethyl quinoline hydrobromide,
2,4,8-trimethyl quinoline hydrobromide,
pyridine hydrobromide,
2-methyl-5-ethyl pyridine hydrobromide,
pyrimidine hydrobromide,
2,3-dimethyl pyridine hydrobromide,
2,4-dimethyl pyridine hydrobromide,
2,5-dimethyl pyridine hydrobromide,
2,6-dimethyl pyridine hydrobromide,
3,4-dimethyl pyridine hydrobromide,
3,5-dimethyl pyridine hydrobromide,
2-ethyl pyridine hydrobromide,
3-ethyl pyridine hydrobromide,
4-ethyl pyridine hydrobromide,
2,4,6-trimethyl pyridine hydrobromide,
2-propyl pyridine hydrobromide, the aromatic tertiary amine salts of hydrogen bromide such as N,N-dimethylaniline hydrobromide,
N,N-diethylaniline hydrobromide and the like;

and the aliphatic tertiary amine salts of hydrogen bromide such as trimethylamine hydrobromide,
triethylamine hydrobromide,
tri-n-propylamine hydrobromide,
tri-isopropylamine hydrobromide,
tri-n-butylamine hydrobromide,
tri-isobutylamine hydrobromide,
tri-tert.-butylamine hydrobromide,
tri-n-amylamine hydrobromide,
triisoamylamine hydrobromide,
trihexylamine hydrobromide,
diethylmethylamine hydrobromide,
dimethylethylamine hydrobromide,
dimethylcyclohexylamine hydrobromide,
dimethylhexylamine hydrobromide,
diethylhexylamine hydrobromide,
dimethyldecylamine hydrobromide and the like.

Suitable inert organic solvents in which the reaction can be conducted include saturated aliphatic hydrocarbons such as n-pentane, isopentane, n-hexane, 2-methyl pentane, 3-methyl pentane, 2,2-dimethylbutane, 2,3-dimethylbutane, heptane, dodecane and the like; cycloaliphatic hydrocarbons such as 1,1-dimethylcyclopropane, 1,1,2-trimethylcyclopropane, 1,2,3-trimethylcyclopropane, cyclobutane, methylcyclobutane, ethylcyclobutane, cyclopentane, methylcyclopentane, methylcyclohexane, cyclohexane and the like; halogenated aliphatic hydrocarbons such as ethyl chloride, ethyl bromide, ethyl iodide, n-propyl chloride, isopropyl chloride, butyl chloride, isobutyl chloride, propyl iodide, ethylene dichloride, methylene chloride, methylene bromide, chloroform, carbon tetrachloride, tetrachloroethane, pentachloroethane and the like; aromatic hydrocarbons such as benzene, toluene, xylene, ethylbenzene, n-propylbenzenes and the like; halogenated aromatic hydrocarbons such as chlorobenzene, dichlorobenzene, bromobenzene, iodobenzene, benzyl chloride, chlorotoluene, bromotoluene, iodotoluene and the like; and nitro derivatives of aromatic hydrocarbons such as nitrobenzene and the like. Additional examples of solvents which may be employed herein are saturated aliphatic monocarboxylic acids such as acetic, propionic, butyric, ethylbutyric, caproic, enanthic, caprylic, pelargonic, capric, undecanoic, lauric, myristic, palmitic, stearic, arachidic and the like; and saturated aliphatic dicarboxylic acids such as oxalic, malonic, succinic, glutaric, adipic, pimelic, suberic, azelaic, sebacic and the like.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

Example 1

To a suitable reaction vessel, equipped with means for addition and removal of heat, means for agitation, temperature recording means, means for addition of reactants, means for removal of reaction mass, means for condensing vapors and means for aeration, there are charged 50.0 grams (0.275 mol) of triethylamine hydrobromide and 100 ml. of chloroform. A flow of nitrogen is started through the system. The mixture is stirred and is heated to a reflux temperature of about 61° C. There is then slowly added 53.9 grams (0.55 mol) of concentrated sulfuric acid over a period of about ½ hour. Upon completion of the addition of the concentrated sulfuric acid, the reaction mass is stirred and refluxed for an additional 6 hours. The gaseous hydrogen bromide is evolved during the reaction in about 74.6% of the theoretical yield.

Example 2

A reaction vessel as described in Example 1 is charged with 17.3 grams (0.275 mol) of sodium bromide and 100 ml. of acetic acid. A flow of nitrogen is started through the system. The mixture is stirred and is heated to a reflux temperature of about 114° C. Approximately 32.3 grams (0.33 mol) of concentrated sulfuric acid is added slowly over a period of about ½ hour. Upon completion of the addition of the concentrated sulfuric acid, the reaction mass is stirred and refluxed for an additional 6½ hours. A yield of 91.4% of theory of gaseous hydrogen bromide is obtained.

Example 3

A reaction vessel as described in Example 1 is charged with 25.3 grams (0.107 mol) of calcium bromide and 60 ml. of pentachloroethane. A flow of nitrogen is started through the system. The mixture is stirred and is heated to a temperature of about 63° C. To this mixture, 22.4 grams (0.23 mol) of concentrated sulfuric acid is added slowly over a period of about 5 minutes. Upon completion of the addition of the concentrated sulfuric acid, the reaction mass is stirred and refluxed for an additional 5¾ hours. The gaseous hydrogen bromide evolved during the reaction is obtained in approximately 100% of the theoretical yield.

Example 4

A reaction vessel as described in Example 1 is charged with 32.4 grams (0.138 mol) of calcium bromide and 100 ml. of acetic acid. A flow of nitrogen is started through the system. The mixture is agitated and is heated to a reflux temperature of about 114° C. There is then slowly added 32.3 grams (0.33 mol) of concentrated sulfuric acid over a period of about 1½ hours. Upon completion of the addition of the concentrated sulfuric acid, the reaction mass is stirred and refluxed for an additional 5½ hours. The yield of gaseous hydrogen bromide is 96% of the theoretical yield.

While this invention has been described with respect to certain embodiments, it is not so limited, and it is to be understood that variations and modifications thereof may be made which are obvious to those skilled in the art without departing from the spirit or scope of this invention.

The embodiments of the invention in which an exclusive property or privilege is cliamed are defined as follows:

1. A process for the preparation of substantially anhydrous gaseous hydrogen bromide, wherein the hydrogen bromide is substantially devoid of free bromine, which comprises reacting under substantially anhydrous conditions a compound selected from the group consisting of alkali metal bromides, alkaline earth metal bromides and tertiary amine salts of hydrogen bromide with concentrated sulfuric acid in the presence of an inert organic solvent at a temperature of from about 25° C. to about 150° C., wherein the amount of sulfuric acid employed is equal to at least one mole for each equivalent of bromide salt reactant.

2. A process as defined in claim 1 wherein the alkali metal bromide is sodium bromide.

3. A process as defined in claim 1 wherein the alkaline earth metal bromide is calcium bromide.

4. A process as defined in claim 1 wherein the tertiary amine salt of hydrogen bromide is triethylamine hydrobromide.

5. A process as defined in claim 1 wherein the inert organic solvent is acetic acid.

6. A process as defined in claim 1 wherein the inert organic solvent is pentachloroethane.

7. A process as defined in claim 1 wherein the inert organic solvent is chloroform.

8. A process as defined in claim 1 wherein the temperature range is from about 90° C. to about 130° C.

References Cited

UNITED STATES PATENTS

| | | | |
|---|---|---|---|
| 601,006 | 3/1898 | Sturcke | 23—122 |
| 1,379,731 | 5/1921 | Theimer | 23—154 |
| 2,282,712 | 5/1942 | Engs et al. | 23—154 XR |
| 2,355,857 | 8/1944 | Hachmuth | 23—154 XR |
| 2,825,627 | 3/1958 | Redniss et al. | 23—154 |
| 2,937,926 | 5/1960 | Hanusch | 23—122 |
| 3,199,953 | 8/1965 | Suzuki | 23—154 |

EDWARD STERN, Primary Examiner.

U.S. Cl. X.R.

23—122, 156